(12) United States Patent
Lee et al.

(10) Patent No.: US 7,190,424 B2
(45) Date of Patent: Mar. 13, 2007

(54) LAMP WIRES OF A LIQUID CRYSTAL DISPLAY SECURED IN TRENCHES EXTENDING AT AN ANGLE TO A PLATE SIDEWALL

(75) Inventors: Tae-Jin Lee, Gyeonggi-do (KR); Jong-Dae Park, Seoul (KR); Jung-Soo Ok, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 193 days.

(21) Appl. No.: 10/795,526

(22) Filed: Mar. 9, 2004

(65) Prior Publication Data
US 2004/0252252 A1 Dec. 16, 2004

(30) Foreign Application Priority Data
Jun. 10, 2003 (KR) .................. 10-2003-0037229
Dec. 16, 2003 (KR) .................. 10-2003-0091755

(51) Int. Cl.
*G02F 1/1333* (2006.01)

(52) U.S. Cl. .................. 349/58; 349/58; 361/681; 362/632

(58) Field of Classification Search .................. 349/58; 361/681; 362/362
See application file for complete search history.

(56) References Cited

U.S. PATENT DOCUMENTS

| 6,231,202 | B1 * | 5/2001 | Kozaka et al. ............... 362/614 |
| 6,429,912 | B2 * | 8/2002 | Nagasaki ..................... 349/58 |
| 6,501,642 | B2 * | 12/2002 | Kim ........................... 361/681 |
| 2003/0016312 | A1 * | 1/2003 | Park et al. .................... 349/58 |

* cited by examiner

*Primary Examiner*—Andrew Schechter
*Assistant Examiner*—Hoan C. Nguyen
(74) *Attorney, Agent, or Firm*—F. Chau & Associates LLC

(57) ABSTRACT

The present invention is broadly directed towards a receiving container for an LCD apparatus for securing a lamp and lamp wiring connected to a lamp. The receiving container has features for substantially preventing the lamp wiring from being disconnected from the lamp. For example, a first through-hole for receiving the lamp wiring, a first trench, securing members, and securing projections are utilized to substantially prevent lamp wiring from being disconnected from a lamp. Additionally, the LCD apparatus is easily handled, dissipates heat effectively, and has a light weight.

17 Claims, 19 Drawing Sheets

LAMP WIRES OF A LIQUID CRYSTAL DISPLAY SECURED IN TRENCHES EXTENDING AT AN ANGLE TO A PLATE SIDEWALL

This application claims the benefit of Korean Patent Application No. 2003-37229, filed on Jun. 10, 2003 and Korean Patent Application No. 2003-0091755, filed on Dec. 16, 2003, which are hereby incorporated by reference for all purposes as if fully set forth herein.

BACKGROUND OF THE INVENTION

1. Field of the Invention

The present invention relates to a receiving container and a backlight assembly of a liquid crystal display (LCD) device, and more particularly, to a receiving container for securing a lamp having a lamp wiring connected to the lamp, thereby substantially preventing the lamp wiring from being disconnected from the lamp.

2. Discussion of the Related Art

The light transmittance of an LCD device may vary as the arrangement of liquid crystals inside the LCD change in response to applied electric fields. The LCD device displays information by utilizing the various arrangements of liquid crystals. An LCD device transmitter includes a LCD panel, a backlight assembly, thin film transistors (TFTs), liquid crystals, and color filter substrates.

The backlight assembly includes a lamp assembly a receiving container for receiving the LCD panel and the lamp assembly. The lamp assembly includes a lamp, a lamp cover for covering the lamp, and lamp wiring for supplying a power source to the lamp. The lamp is arranged in the receiving container. The lamp wiring extends from an inside portion of the receiving container to an outside portion of the receiving container. The lamp wiring is connected to an inverter arranged outside of the receiving container.

The conventional lamp wiring is flexible making the lamp wiring difficult to handle. A securing projection is used for separating the lamp from the lamp wiring during the manufacturing process for the LCD device. Lamp wiring is arranged outside of the receiving container, thereby increasing the size and weight of the LCD device.

The present invention is directed towards overcoming problems and disadvantages of the related art.

BRIEF SUMMARY OF THE INVENTION

Accordingly, the present invention is directed to a liquid crystal display and assembly thereof that substantially obviates one or more of the problems due to the limitations and disadvantages of the related art.

An advantage of the present invention is to provide a lightweight liquid crystal display and assembly thereof.

Another advantage of the present invention is to provide various elements for substantially preventing lamp wiring from being disconnected from a lamp of the liquid crystal display.

Yet another advantage of the present invention is to provide a receiving container geometry for dissipating heat generated by the liquid crystal display.

Additional features and advantages of the invention will be set forth in the description which follows, and in part will be apparent from the description, or may be learned by practice of the invention. The features and other advantages of the invention will be realized and attained by the structure particularly pointed out in the written description and claims hereof as well as the appended drawings.

To achieve these and other advantages and in accordance with the present invention, as embodied and broadly described, a receiving container for an LCD apparatus is provided. The receiving container includes a lower plate having a first sidewall, wherein the first sidewall includes a through-hole. A trench is formed on an upper surface of the lower plate, wherein the trench substantially prevents lamp wiring from being disconnected from a lamp.

In another aspect of the present invention, a liquid crystal display -includes a chassis for receiving an LCD panel assembly, an optical member arranged below a LCD panel, and a first receiving container. The first receiving container includes a lower plate having sidewalls, wherein a portion of the first plate is removed for forming a receiving space. A trench is arranged along a portion of the lower plate for receiving lamp wiring. A through-hole is arranged on at least one of the sidewalls for receiving the wiring, wherein the through-hole extends through at least one of the sidewalls into an inside portion of the receiving container. A lamp assembly is arranged in a second receiving container, wherein the first receiving container is arranged over the second receiving container.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
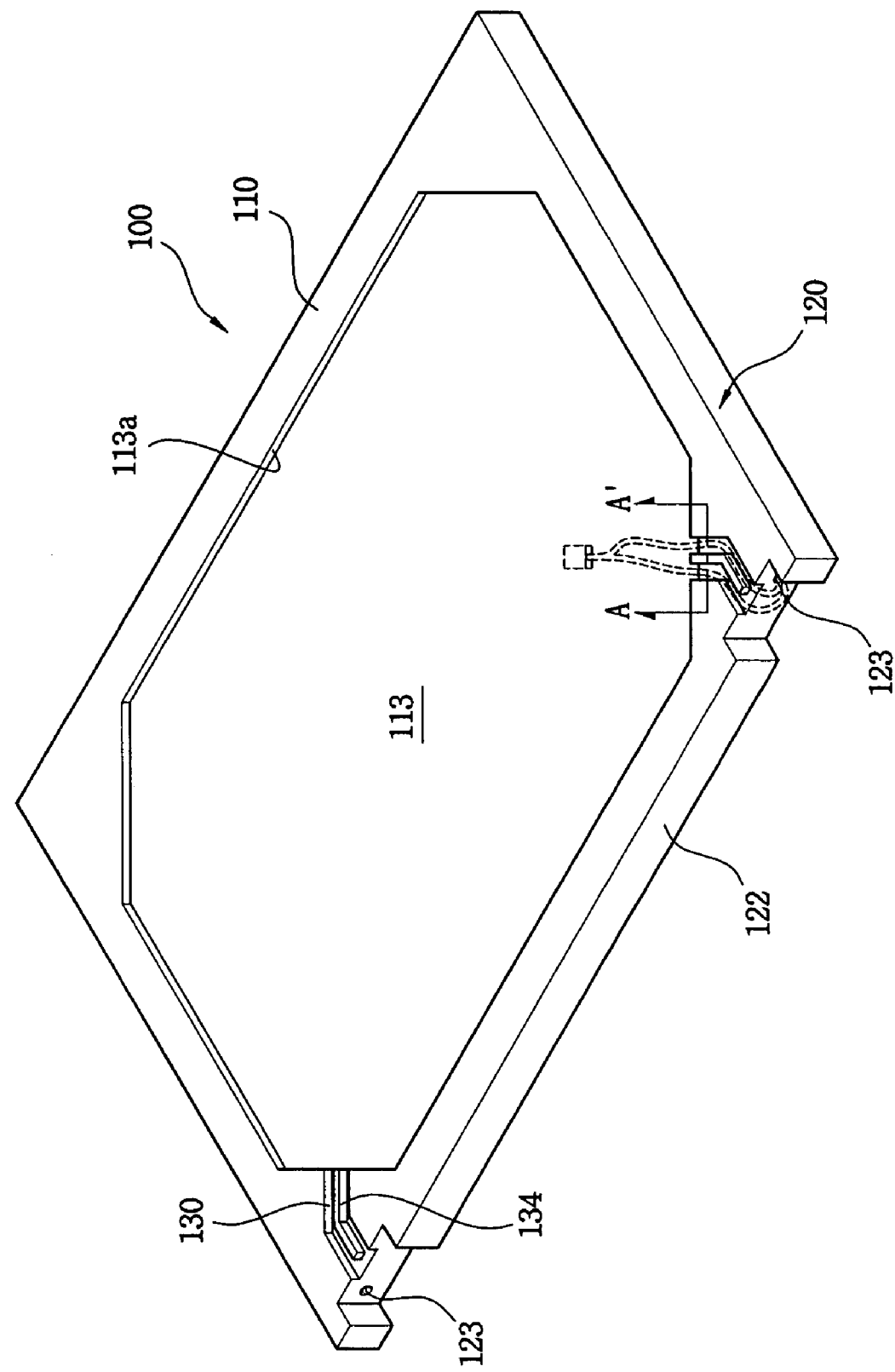
FIG. 1 shows a perspective view of a receiving container for an LCD apparatus according to an exemplary embodiment of the present invention.

Reference will now be made in detail to embodiments of the invention, an example of which is illustrated in the accompanying drawings, in which like reference characters refer to corresponding elements.

Figure 2:
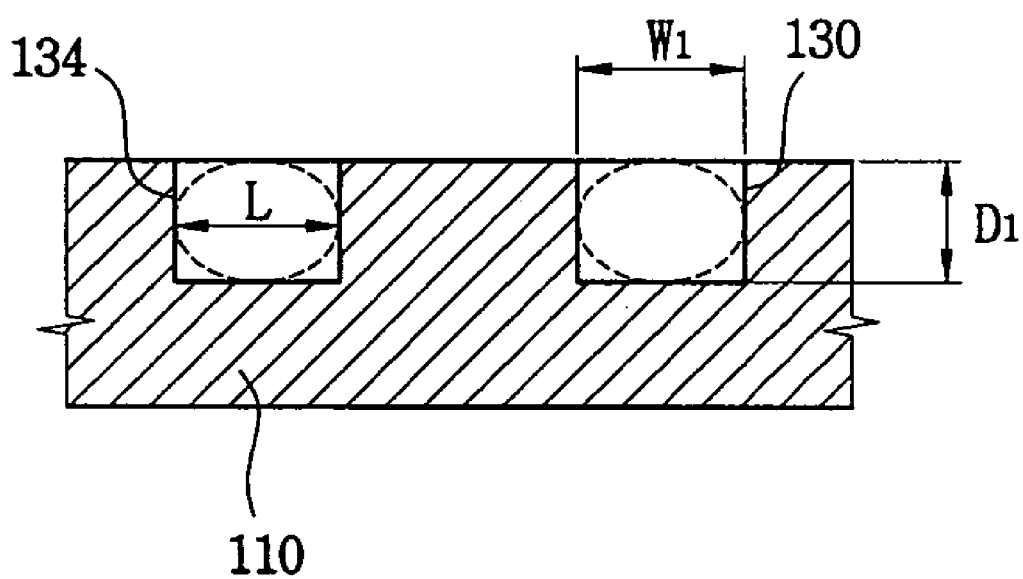
FIG. 2 shows an enlarged cross-sectional view of FIG. 1 taken along line A to A'.

FIG. 1 shows a perspective view of a rear chassis of a receiving container for an LCD apparatus according to an exemplary embodiment of the present invention. FIG. 2 shows an enlarged cross-sectional view of FIG. 1 taken along line A to A' of the present invention. The receiving container is generally depicted as reference 100. The receiving container includes a lower plate 110. The lower plate includes sidewalls and trenches, such as, for example, a first sidewall 122 and a trench 130 formed on portions of the lower plate 110.

The lower plate 110 may be formed into a number of different geometric shapes, such as, a substantially rectangular, parallelepiped shape, or the like. For example, as shown in FIG. 1, the lower plate 110 has a substantially flat shape. The lower plate may be formed from plastic, synthetic resin, and the like.

An opening 113 may be formed on the lower plate, thereby decreasing the weight of the receiving container 100. Additionally, the opening 113 allows heat generated from the components arranged within the receiving container to dissipate. The opening 113 includes an inner surface 113a. The opening may be formed by any suitable conventional techniques, for example, cutting an opening 113 into the lower plate, molding techniques, and the like.

The sidewalls 120 extend along the edges of the lower plate 110, thereby forming a receiving space. A lamp, a light guide plate, optical plates, an LCD panel, and the like are disposed in the receiving space. At least one through-hole 123 is formed along an edge portion of the first sidewall 122.

The trench 130 has a depression that maybe formed in a number of different geometric configurations, for example, a groove type shape. The trench may extend along a portion of the lower plate 110 from an outer surface of the first sidewall 122 to an inner surface 113a. The through-hole 123 may be formed proximate to the first trench 130.

Referring to FIG. 2, the trench 130 has a width $W_1$ and a depth $D_1$. The size of width $W_1$ and depth $D_1$ are set to correspond to the size of the diameter of lamp wiring arranged in the trench 130. For example, the width $W_1$ and depth $D_1$ of the trench 130 may be formed to have a size greater than or equal to a lamp wire diameter 'L'. In this configuration the lamp wiring is substantially prevented from protruding out of the trench 130.

The receiving container for the LCD device may include a plurality of the trenches 130 arranged at various positions of the lower plate 110. The number of the trenches 130 may be identical to the number of lamp wires. For example, if there are two lamp wires, a trench 130 and a trench 134 are formed on the outer surface of the lower plate 110. The lamp wires are secured to a portion of the lower plate 110 by being inserted into the various trenches. Accordingly, the lamp wiring is more easily handled than the lamp wiring of the related art. Additionally, the lamp wiring is substantially prevented from being disconnected from the lamp as they are secured in the various trenches.

Figure 3:
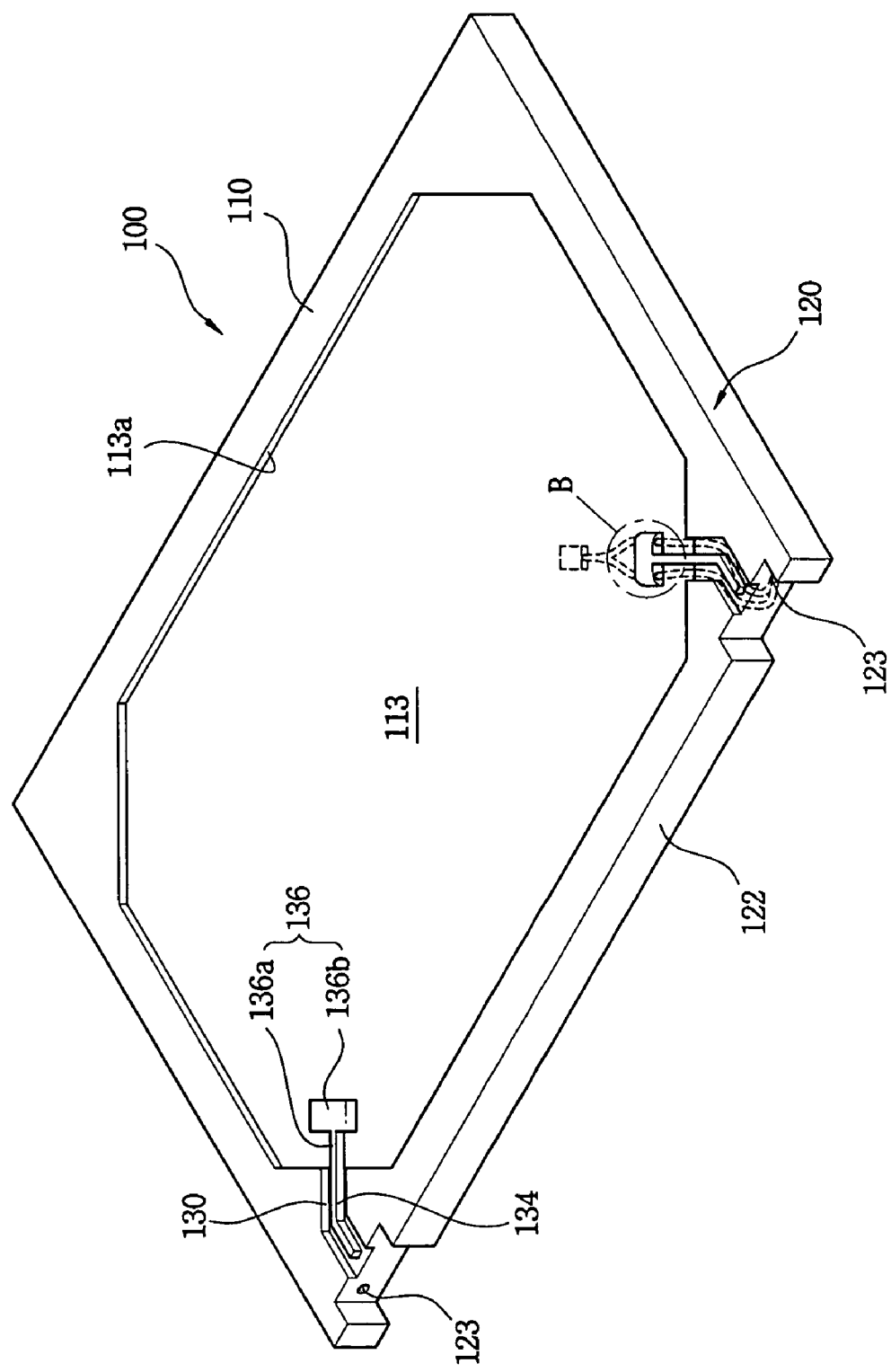
FIG. 3 shows a perspective view of a receiving container for an LCD apparatus according to another exemplary embodiment of the present invention.
Figure 4:
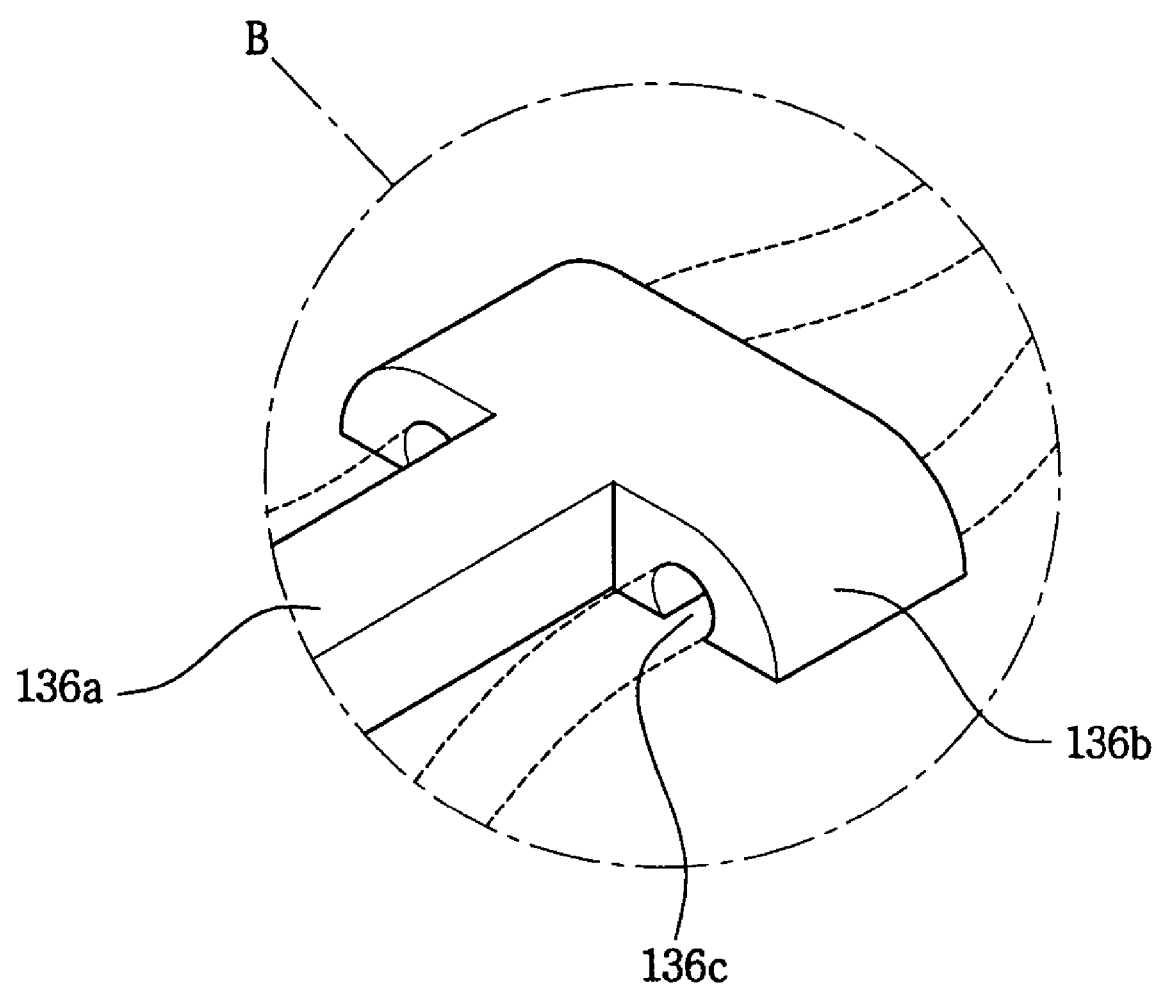
FIG. 4 shows an enlarged perspective view of FIG. 3 showing an enlarged portion B.

FIG. 3 shows a perspective view of a receiving container for an LCD apparatus according to another exemplary embodiment of the present invention. FIG. 4 shows an enlarged perspective view of FIG. 3 showing an enlarged portion B. Many of the elements in FIGS. 3 and 4 are similar to the elements of FIGS. 1 and 2 as discussed in detail above. Accordingly, a duplicative detailed discussion of these elements is omitted.

Referring to FIGS. 3 and 4, a securing member 136 protrudes from an opening along the inner surface 113a. The securing member 136 secures lamp wiring protruding from the various trenches and may be arranged between inner and outer surfaces of the lower plate 110. The securing member 136 may be arranged to be substantially parallel with the inner and outer surfaces of the lower plate 110.

The securing member 136 may include a first and second securing part 136a and 136b. The first securing part 136a may extend from an opening in the inner surface 113a and the second securing part 136b may extend in a direction substantially perpendicular to the first securing part 136a. In this configuration, the second securing part 136b may be arranged to be substantially parallel with the lower plate 110. Of course, any other suitable type of arrangement is contemplated by the inventors.

A securing groove 136c may be formed in a portion of the securing member 136; For example, the securing groove 136c may be formed in a lower portion of the second securing part 136b. The securing part 136 may include a plurality of securing grooves 136c. The number of the securing grooves 136c may be identical to the number of wires. For example, two securing grooves 136c may be formed for securing two lamp wires. The securing grooves 136c are formed to a sufficient width and depth in order to substantially prevent the lamp wiring from being separated from the securing grooves 136c.

The securing member 136 secures lamp wiring arranged in the first trench 130, thereby allowing the lamp wiring to be easily handled. The securing member 136 substantially prevents forces from being transmitted to the lamp wiring and the connecting part of the lamp, thereby preventing the lamp wiring from being disconnected from the lamp.

Figure 5:
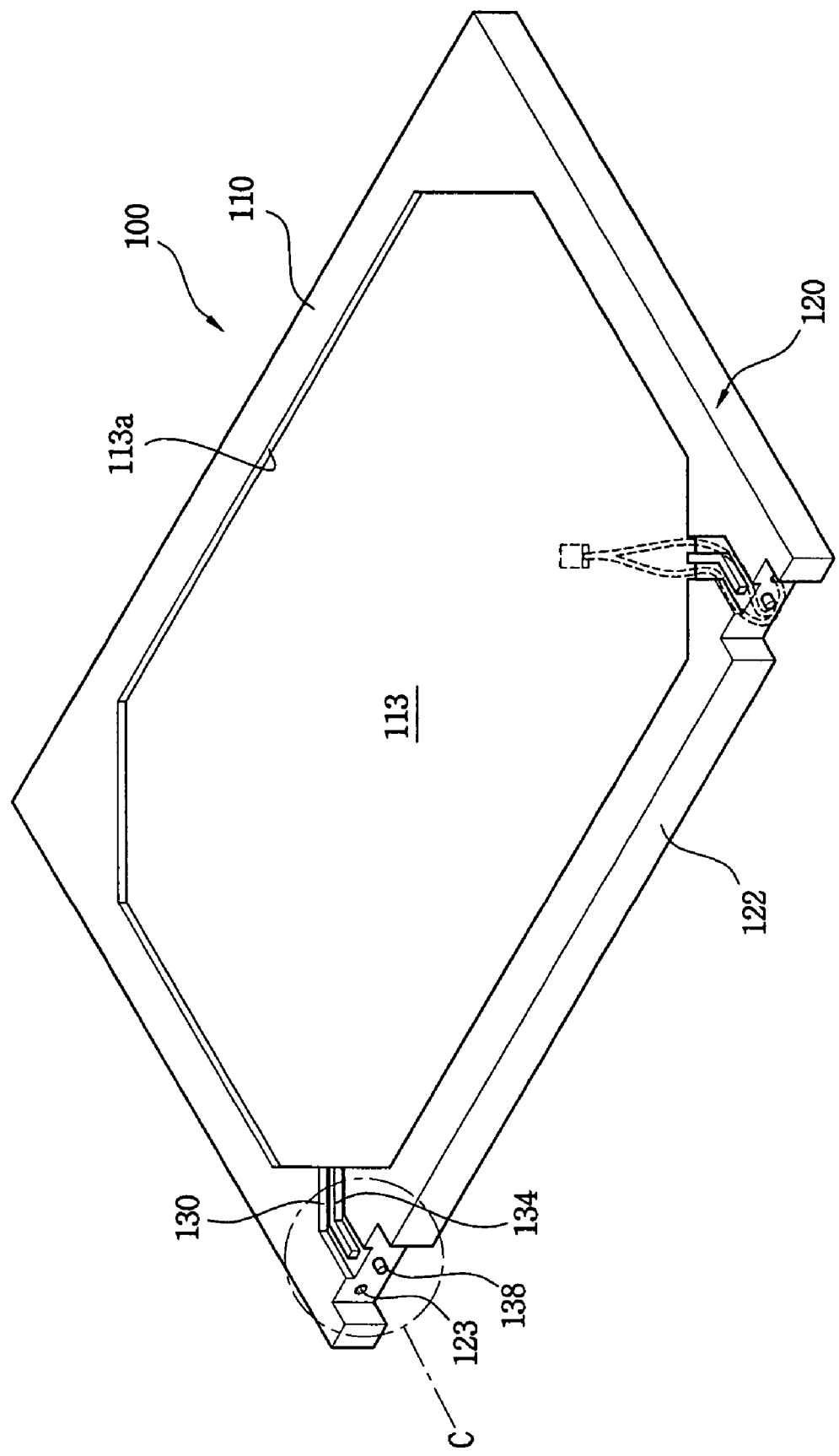
FIG. 5 shows a perspective view of a receiving container for an LCD apparatus according to another exemplary embodiment of the present invention.
Figure 6:
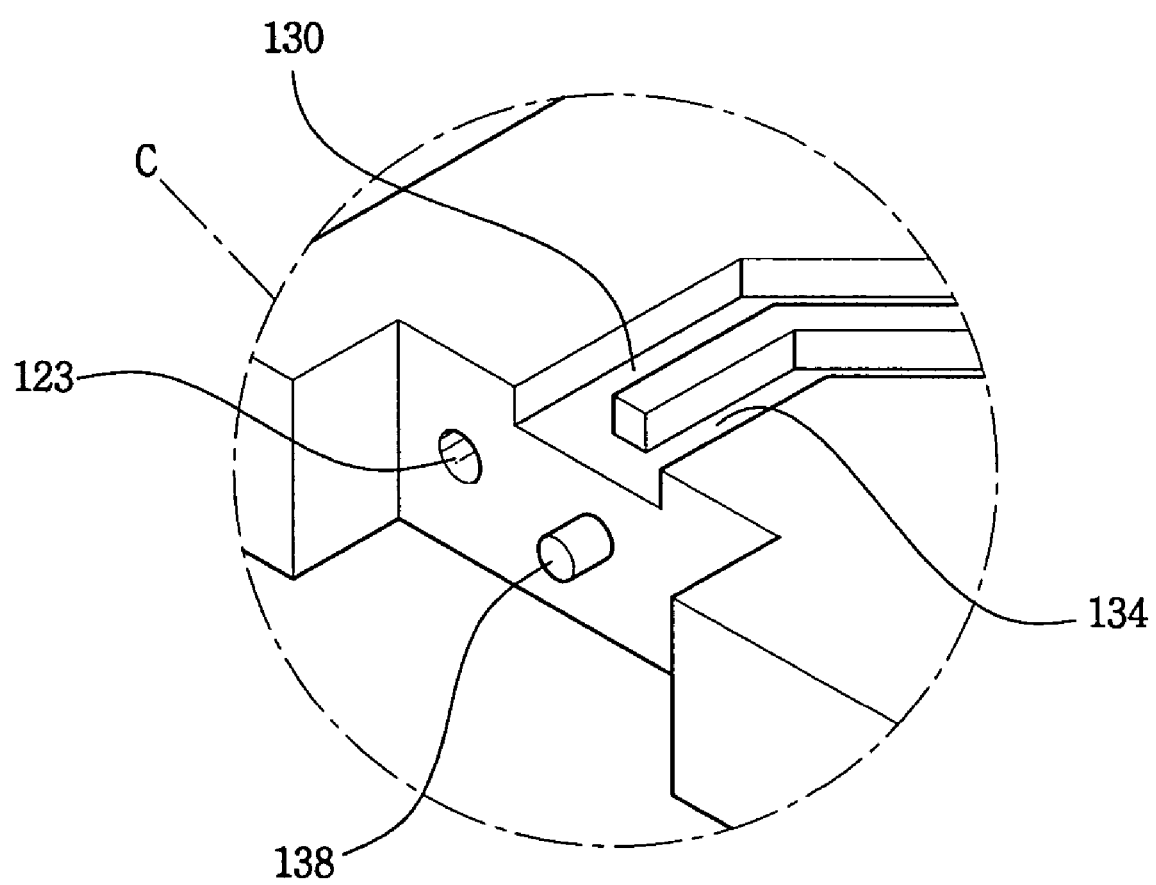
FIG. 6 shows an enlarged perspective view of FIG. 5 showing an enlarged portion C.

FIG. 5 shows a perspective view of a receiving container for an LCD apparatus according to another exemplary embodiment of the present invention. FIG. 6 shows an enlarged perspective view of FIG. 5 showing an enlarged portion C. Many of the elements in FIGS. 5 and 6 are similar to the elements of FIGS. 1 and 2 as discussed in detail above. Accordingly, a duplicative discussion of these elements is omitted.

Referring to FIGS. 5 and 6, trenches 130 and 134 are formed on the lower plate 110. The sidewall 122 includes securing projection 138. The securing projection 138 prevents lamp wiring from being disconnected due to external forces.

The securing projection 138 protrudes from a region below trenches 130 and 134 and is formed along a portion of the first sidewall 122. The length of the securing projection 138 may be shorter than or equal to a depth of the trench 130. However, other lengths are also suitable. The securing projection 138 may be designed in a wide variety of geometric shapes. For example, it may be in a cylindrical shape, rectangular shape, prism shape, and the like. FIGS. 5 and 6 show the securing projection 138 in a cylindrical shape. The trench 130 and securing projection 138 allow for the dispersion of force that may be provided to lamp wiring in order to prevent the lamp wiring from being disconnected from the lamp. That is, lamp wiring may be arranged around a portion of the securing projection 138 and in a portion of trenches 130 and 134, thereby securing the lamp wiring and preventing the wiring from being disconnected from the lamp. There may be a plurality of securing projections.

Figure 7:
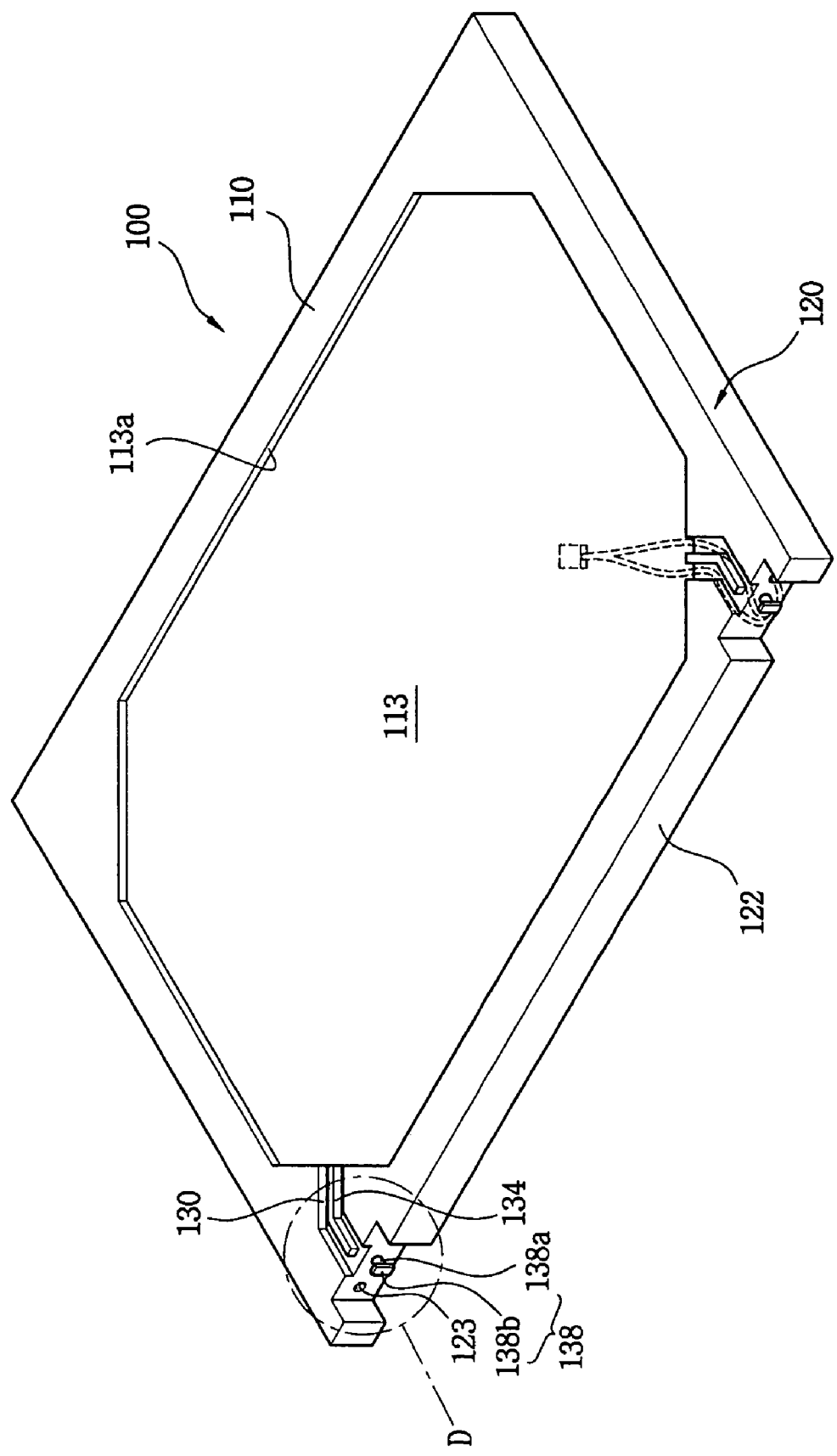
FIG. 7 shows a perspective view of a receiving container for an LCD apparatus according to another exemplary embodiment of the present invention.
Figure 8:
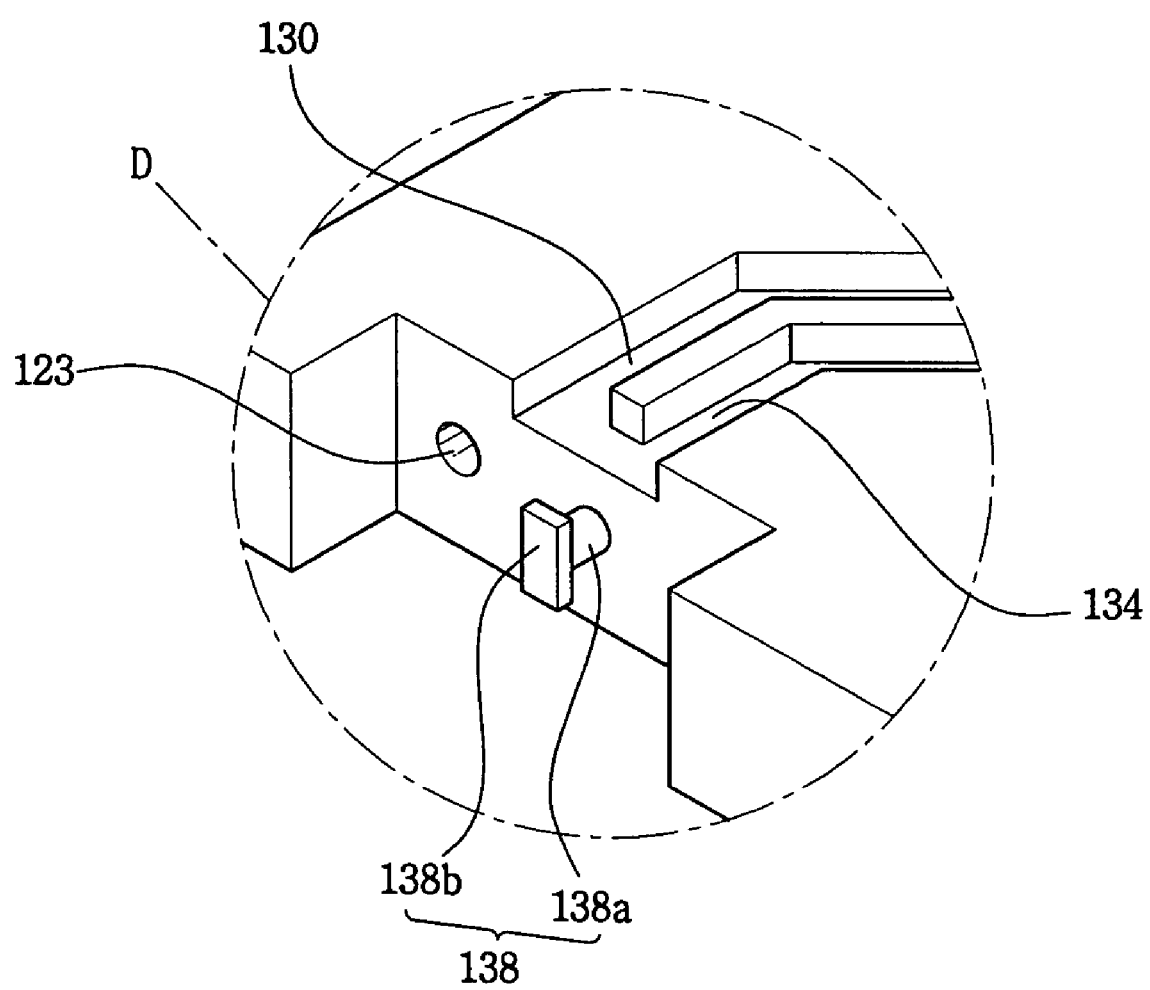
FIG. 8 shows an enlarged perspective view of FIG. 7 showing an enlarged portion D.

FIG. 7 shows a perspective view of a receiving container for an LCD apparatus according to another exemplary embodiment of the present invention. FIG. 8 shows an enlarged perspective view of FIG. 7 showing an enlarged portion D. Many of the elements in FIGS. 5 and 6 are similar to the elements of FIGS. 1 and 2 as discussed in detail above. Accordingly, a duplicative discussion of these elements is omitted.

Referring to FIGS. 7 and 8, trenches 130 and 134 are formed on the first sidewall 122. The first sidewall includes securing projections 138' for substantially preventing lamp wiring from being disconnected from a lamp.

The securing projection 138' includes a first securing projection 138a and a second securing projection 138b. The first securing projection 138a protrudes below a portion of the trench 130 and is arranged at a predetermined height along the first sidewall 122. The second securing projection 138b protrudes from an end portion of the first securing projection 138a. The second securing projection 138b may be arranged at any angle from the end portion of the first securing projection 138a. For example, the second securing projection 138b may be formed at an angle which is substantially perpendicular to the first securing projection 138a.

There may be any number of securing projections 138' arranged along the first sidewall 122 for securing the lamp wirings. For example, in one configuration, there may be two securing projections 138' arranged along the first sidewall 122. These securing projections 138' may include a first securing projection 138a and the second securing projection 138b, which form a 'T' shape at their respective intersection. The second wiring securing projection 138b may have a height that extends to a portion of the first trench 130.

Optionally, the securing projections 138' may include a plurality of securing projections arranged on a first securing projection 138a. For example, the securing projection 138' may include two second securing projections 138b arranged on the first securing projection 138a at various angles. The second securing projection 138b also aids in preventing lamp wiring from being separated from the first securing projection 138a.

The lamp wiring may be wound on the first securing projection 138a and second securing projection 138b, thereby preventing lamp wiring from being separated from the first securing projection 138a. Accordingly, the trenches and securing projections 138' disperse external force provided to the lamp wiring and prevent the lamp wiring from being disconnected from the lamp.

Figure 9:
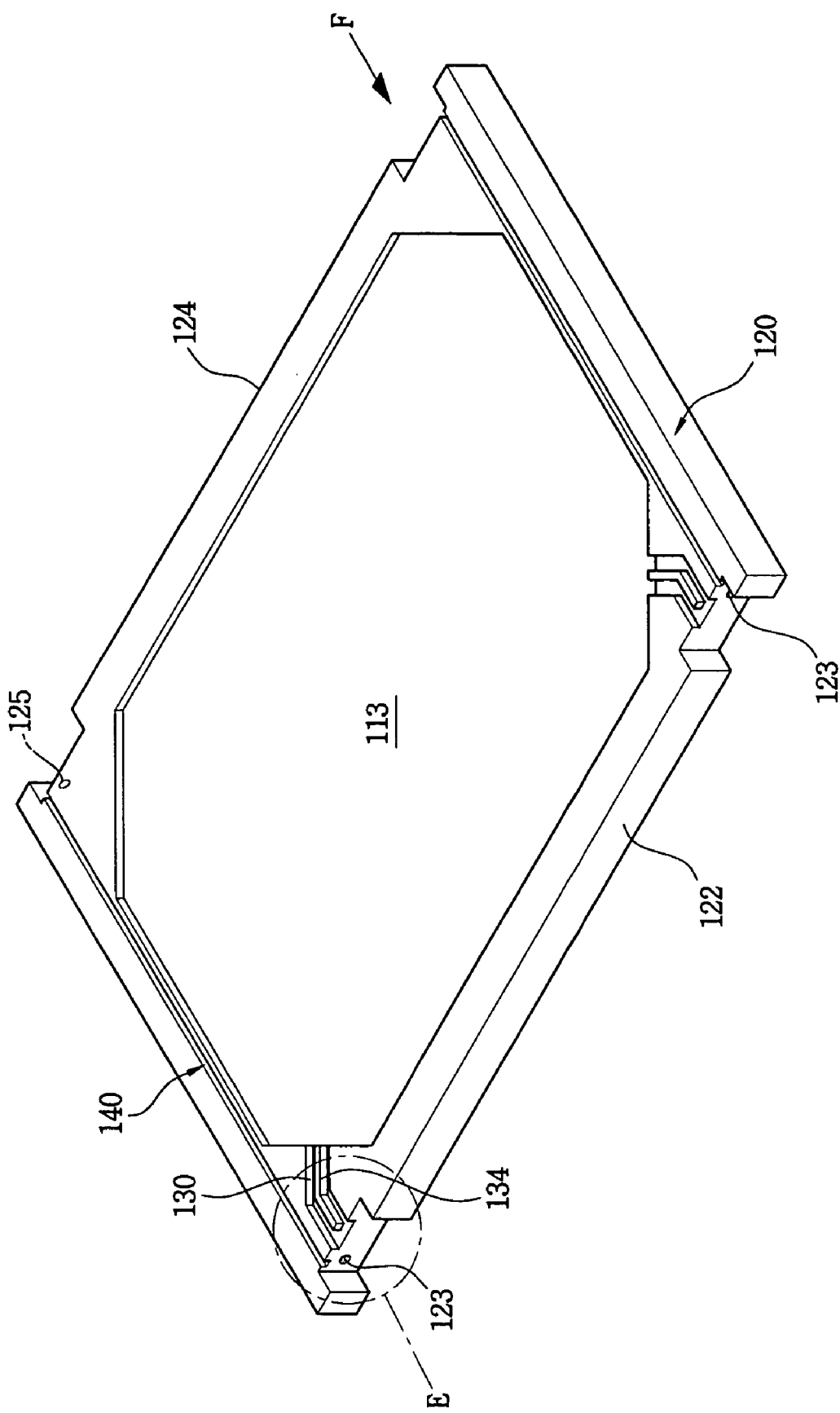
FIG. 9 shows a perspective view of a receiving container for an LCD apparatus according to another exemplary embodiment of the present invention.
Figure 10:
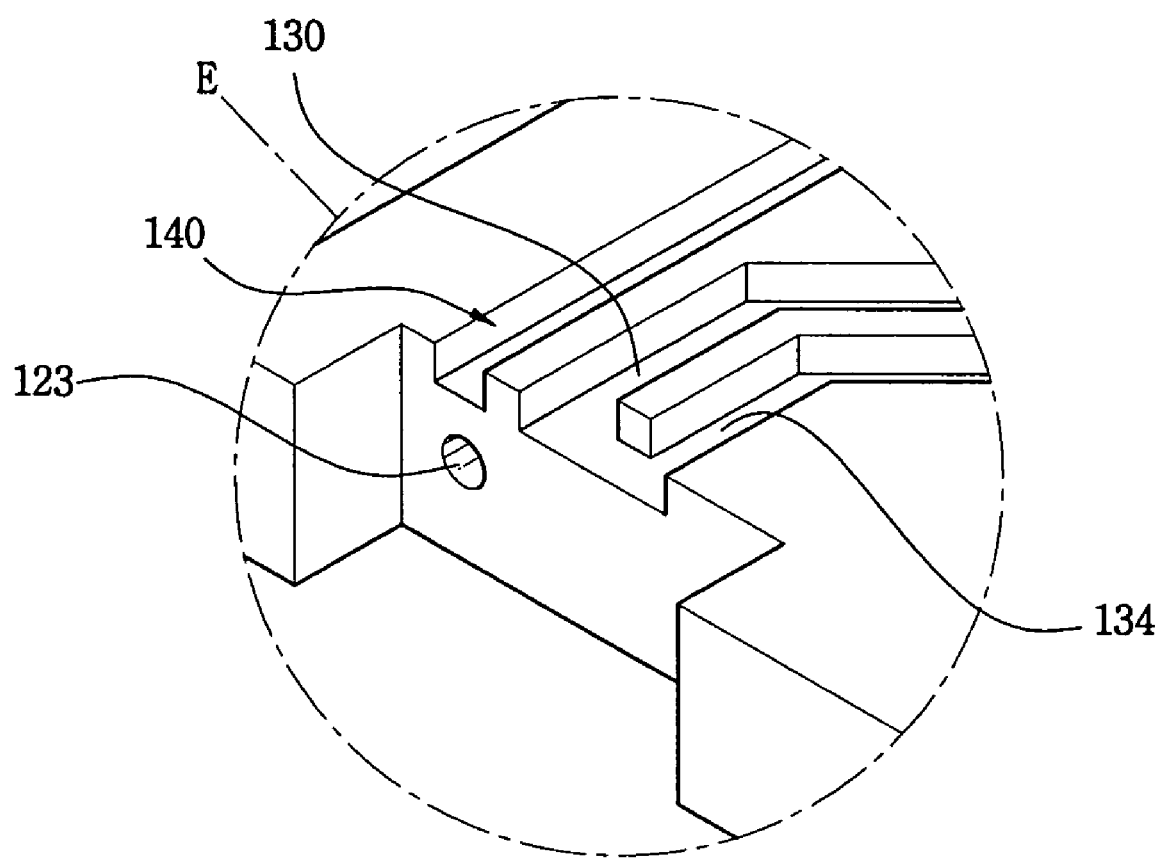
FIG. 10 shows an enlarged perspective view of FIG. 9 showing an enlarged portion E.
Figure 11:
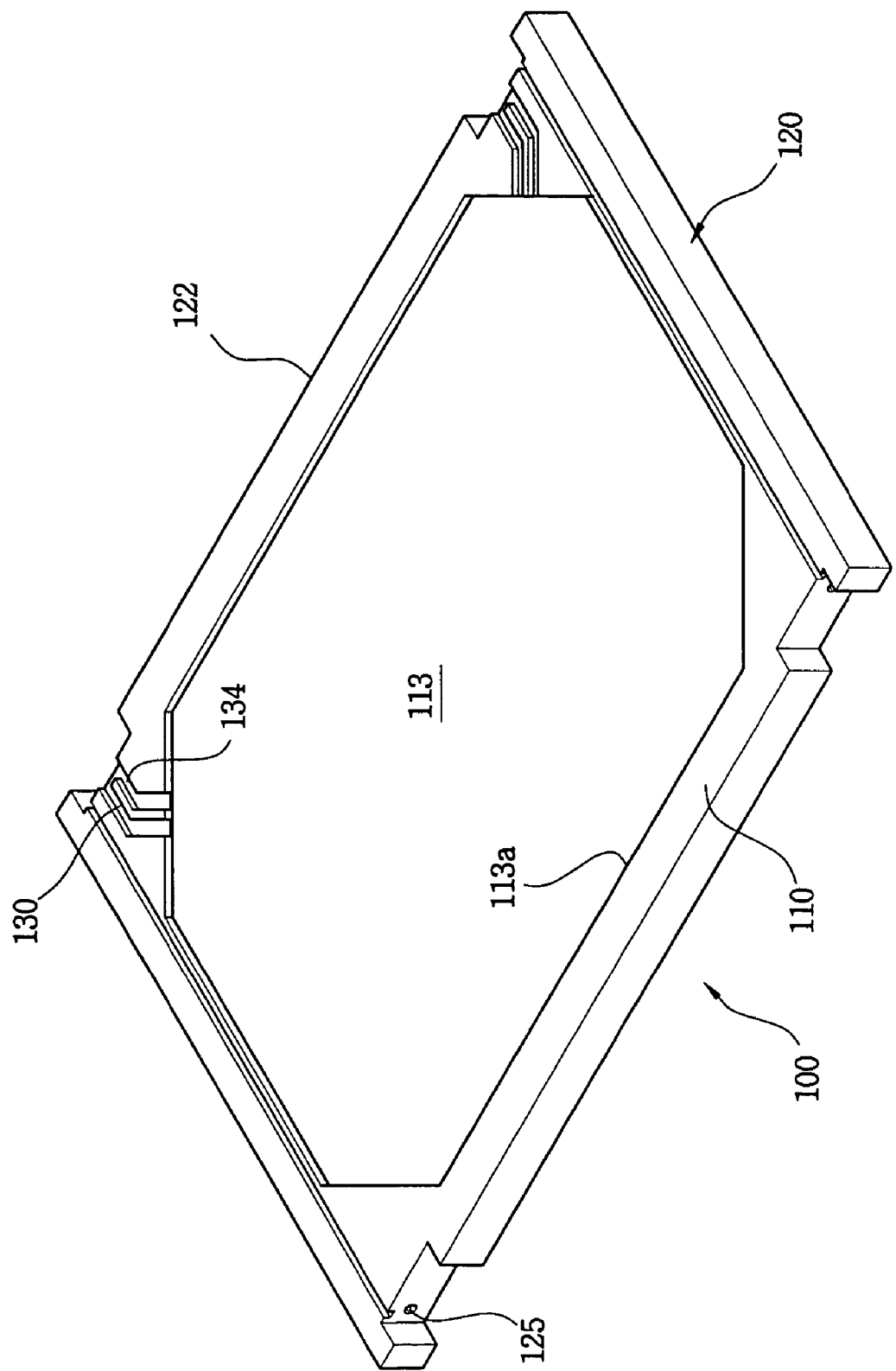
FIG. 11 shows a perspective view of FIG. 9 taken in the F direction.

FIG. 9 shows a perspective view of a receiving container for an LCD apparatus according to another exemplary embodiment of the present invention. FIG. 10 shows an enlarged perspective view of FIG. 9 showing an enlarged portion E. FIG. 11 shows a perspective view of FIG. 9 taken in the 'F' direction. Many of the elements in FIGS. 5 and 6 are similar to the elements of FIGS. 1 and 2 as discussed in detail above. Accordingly, a duplicative discussion of these elements is omitted.

Referring to FIGS. 9, 10, and 11, a second through-hole 125 is formed on a second sidewall 124. The second sidewall is arranged opposite the first sidewall 122. The first through-hole 123 is formed on the first sidewall 122 as discussed in detail above. A second through-hole 125 is formed along a portion of the second sidewall 124 and faces the first through-hole 123. Lamp wiring is arranged through the second through-hole 125.

Auxiliary trenches 140 may be formed on an outer surface of the lower plate 110. The auxiliary trench 140 extends from an outer surface of the first sidewall 122 to an outer surface of the second sidewall 124. The auxiliary trench 140 is arranged proximate to a portion of trench 130. The auxiliary trench 140 provides a securing mechanism for the lamp wiring disposed through the first and second through-holes.

The lamp wiring may be disposed through the first through-hole 123 and second through-hole 125 so as to be protruding from the first through-hole 123 and second through-hole 125. Additionally, the lamp wiring may be disposed within the receiving container, thereby decreasing size and weight of the LCD apparatus.

Figure 12:
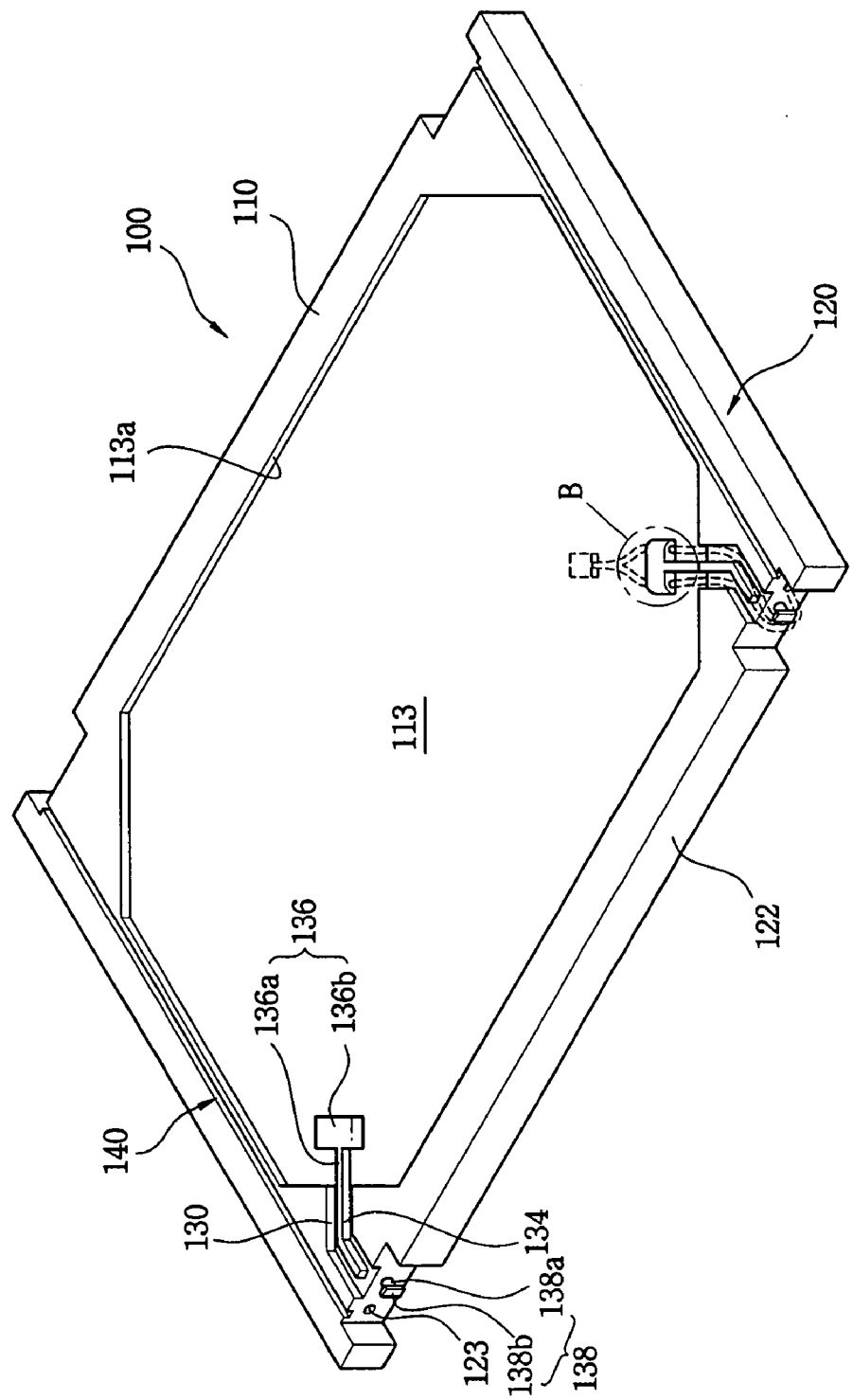
FIG. 12 shows a perspective view of a receiving container for an LCD apparatus according to another exemplary embodiment of the present invention.

FIG. 12 shows a perspective view of a receiving container for an LCD apparatus according to another exemplary embodiment of the present invention. Many of the elements in FIG. 12 are similar to the elements of FIGS. 1 and 2 as discussed in detail above. Accordingly, a duplicative discussion of some of these elements is omitted.

Referring to FIG. 12, a securing member 136 is formed on the lower plate and an inner surface 113a formed on the lower plate 110. A portion of the securing member 136 may be disposed extending into the receiving container between an outer surface and the inner surface of the lower plate 110. The securing part 136 secures the lamp wiring arranged in the securing trenches 130 and 134.

The securing member 136 includes a first securing part 136a and a second securing part 136b. The first securing part 136a may extend from an opening in the inner surface 113a. The second securing part 136b may extend from an end portion of the first securing part 136a. The second securing part 136b may be arranged to be substantially parallel with the lower plate 110. The first wiring securing part 136a and the second securing part 136b may be configured to form a 'T' shape.

Referring back to FIG. 4, a securing groove 136c may be formed on a lower surface of a second securing part 138b. The securing member 136 may include a plurality of securing grooves 136c. The number of securing grooves 136c may be identical to the number of lamp wires. For example, two securing grooves 136c are formed in the second securing part 136b for securing two lamp wires.

Securing projections 138' may be arranged in trenches 130 and 134 and formed on the first sidewall 122 and/or second sidewall 124. The securing projections 138' may be extendable with an application of an external force. That is, the securing projections may be slidably mounted on the lower plate. The securing projections 138' disperse external forces, thereby preventing lamp wiring from being disconnected from the lamp.

The securing projections 138' may include a first securing projection 138a and a second securing projection 138b. The first securing projection 138a protrudes at a predetermined distance below trenches 130 and 134. The second securing projection 138b may be arranged at an end region of the first securing projection 138a. The second securing projection may be arranged at any angle from the first securing projection 138a. For example, the second securing projection 138b may be at an angle which is substantially perpendicular to the first securing projection 138a. Optionally, there may be a plurality of second securing projections 138b arranged on the first securing projection 138a.

Additionally, there may be a plurality of securing projections 138'. For example, there may be two securing projections 138'. In this configuration, the second securing projection 138b may be arranged to be substantially parallel with the first sidewall 122. For example, the first securing projection 138a and the second securing projection 138b may be arranged to form a 'T' shape at their intersections. The length of the second securing projection 138b is typically formed to be shorter than or equal to the depth of trench 130. The size of the LCD apparatus is reduced and the manufacturing process is simplified by utilizing the securing projections 138'.

A second through-hole 125 may be formed on the second sidewall 124 in a position so that the first through-hole 123 and the second through-hole 125 are arranged to be facing each other.

An auxiliary trench 140 may be formed on the second sidewall 124. The auxiliary trench 140 may extend from an outer surface of the second sidewall 124 along an outer surface of the lower plate 110 into an outer surface of the first sidewall. An end portion of the lamp wiring protrudes from the second through-hole 125 and may be inserted into the first trench 130 through the auxiliary trench 140 for securing the lamp wiring. The first and second trenches provide a securing mechanism for the lamp wiring. Additionally, the lamp may be secured by the securing projections. Accordingly, the lamp wiring is secured to substantially prevent the lamp wiring from being disconnected from the lamp.

Figure 13:
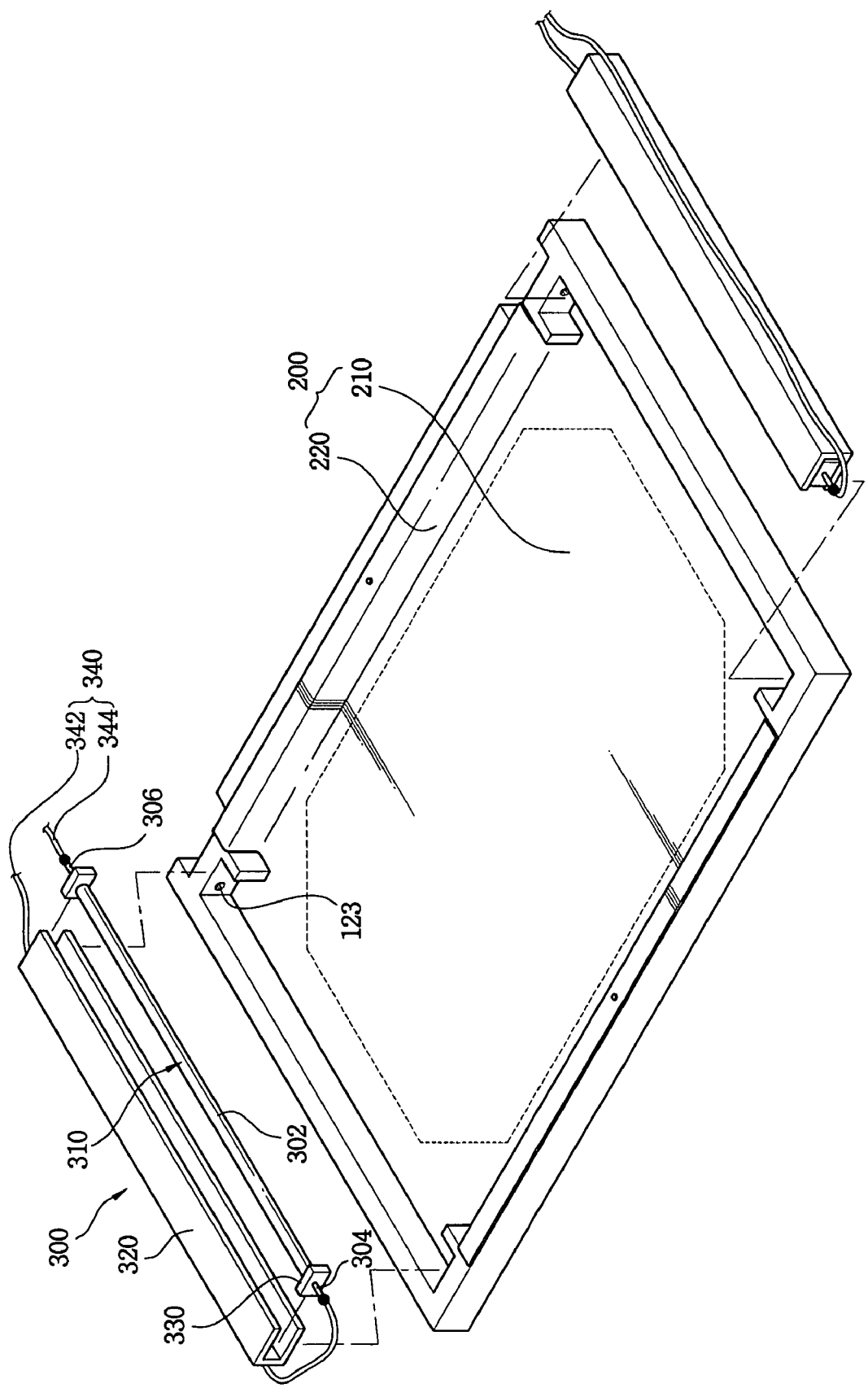
FIG. 13 illustrates a disassembled perspective view of a backlight assembly according to an exemplary embodiment of the present invention.
Figure 14:
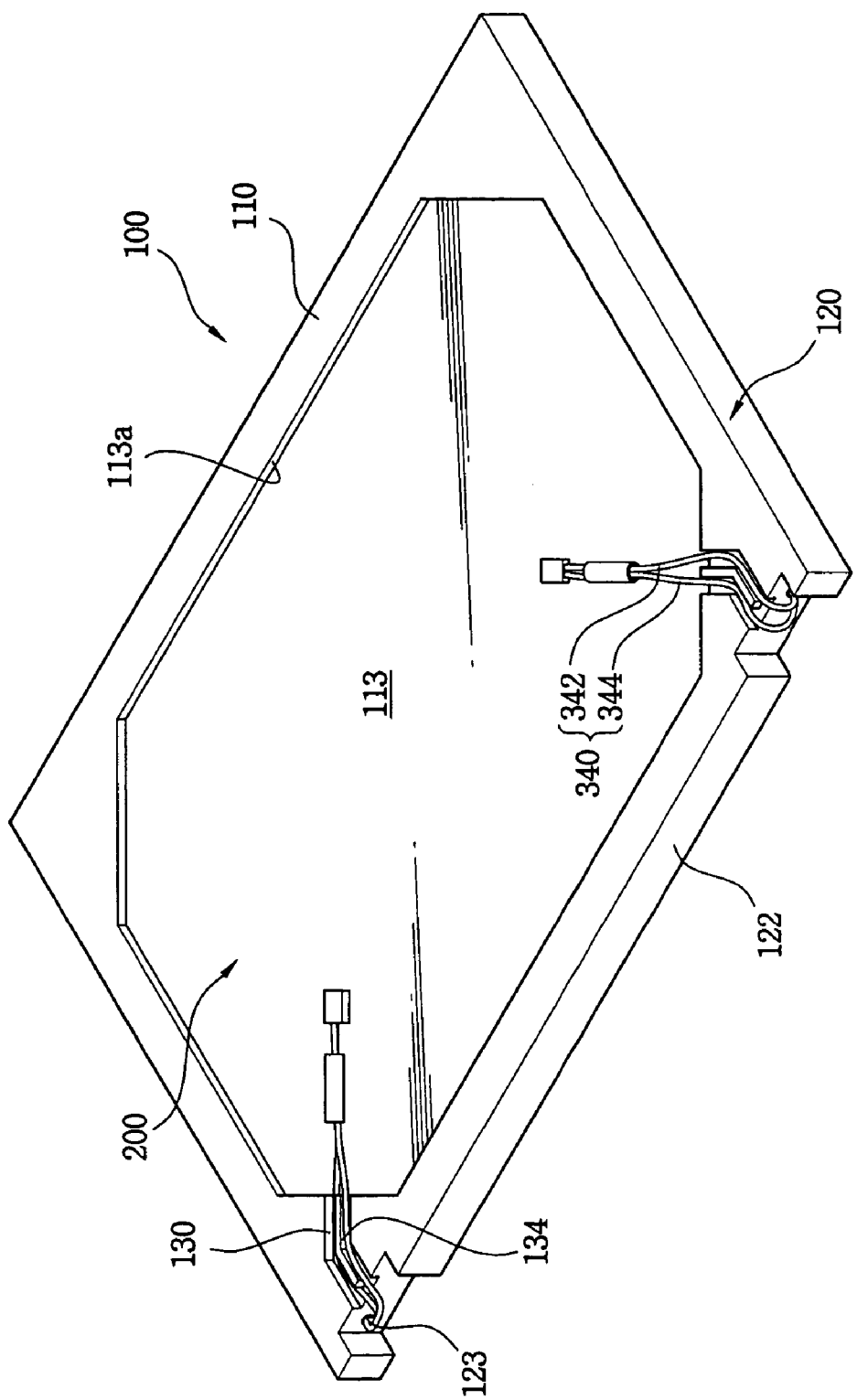
FIG. 14 shows a perspective view of a rear chassis of the backlight assembly shown in FIG. 13.

FIG. 13 illustrates a disassembled perspective view of a backlight assembly according to an exemplary embodiment of the present invention. FIG. 14 shows a perspective view of a rear chassis of the backlight assembly shown in FIG. 13.

Referring to FIGS. 13 and 14, a backlight assembly 600 includes a first receiving container 100, a second receiving container 200 and a lamp assembly 300. The first receiving container 100 includes a lower plate 110, a sidewall 120, and trenches 130 and 134.

The lower plate 110 may be formed from plastic, synthetic resin, and the like. The lower plate 110 may be formed into a substantially geometric shape, for example, a plate shape, rectangular shape, parallelepiped shape, or the like. An opening 113 may be formed into the lower plate 110 for decreasing the weight of the receiving container 100 and enabling heat dissipation. Further, when forming the opening 113 an inner surface 113a is formed. This may be accomplished by removing a portion of the lower plate 110. For example, the opening may be formed by cutting the opening 113 into the lower plate 110, or other suitable techniques.

The sidewalls 120 extend along the edges of the lower plate 110. Accordingly, the lower plate 110 and sidewalls 120 form a receiving space 113. A lamp, a light guide plate, optical plates, an LCD panel, and the like, may be disposed into the receiving space 113. At least one through-hole 123 is formed through a first sidewall 122 and extends from the receiving container. The through-hole 123 is formed on an edge portion of the first sidewall 122.

Trenches 130 and 134 may be formed in a number of different geometric configurations. For example, the trenches 130 and 134 may be formed having a groove shape. The trenches 130 and 134 extend from an outer surface of the first sidewall 122 to an inner surface 113a through a portion of the lower plate 110.

The through-hole 123 may be formed in proximate to trench 130, for example, the through-hole 123 may be formed below a portion of the trench 130.

Referring to FIG. 13, a second receiving container 200 includes a lower plate 210 and a sidewall 220 that extends from the lower plate 210. The second receiving container 200 covers at least a portion of the receiving space 113. The second receiving container 200 may be formed from metal or alloy, for example, aluminum alloy and the like. The second receiving container 200 radiates heat generated from the lamp assembly 300. The lamp assembly 300 is arranged in the receiving space. The lamp assembly 300 may include a lamp 310, a lamp cover 320, a lamp holder, 330 and lamp wirings 340.

The lamp 310 includes a lamp body 302, a first electrode 304, and a second electrode 306. The lamp body 302 may have a tubular configuration and may include glass. A fluorescent layer is formed on an inner surface of the lamp body 302. Discharge gases, such as Mercury (Hg), argon (Ar), neon (Ne), xenon (Xe) and/or krypton (Kr), and the like, are injected into the lamp body 302. The first electrode 304 and second electrode 306 are arranged on the lamp body 302 to supply a discharge voltage to the lamp body 302.

The lamp cover 320 guides a light from the lamp 310 into a predetermined direction. The lamp cover 320 includes a metal, for example, brass, having high light reflectance, arranged on the lamp cover 320. The lamp cover 320 may be in a number of different configurations for reflecting light from the lamp 310. For example, the lamp cover may be in a 'U' shaped configuration. The lamp 310 is arranged in the lamp cover 320 by inserting a lamp holder 330 into the lamp cover 320.

The lamp wirings 340 include a first lamp wiring 342 and a second lamp wiring 344. The first lamp wiring 342 and second lamp wiring 344 are connected to the first electrode 304 and second electrode 306, respectively. The connection may be accomplished by any suitable technique, for example, by soldering. The first lamp wiring 342 may be arranged into a rear surface of the lamp cover 320 so as to be attached to the second lamp wiring 344. The first lamp wiring 342 protrudes from the receiving space via the first through-hole 123 of the first receiving container 100.

The attached first wiring 343 and second wiring 344 are inserted into the trenches 130 and 134 that are formed in the first receiving container 100. Arranging the first and second wirings into the trenches secures the wirings. Accordingly, the lamp wirings 342 and 344 of the lamp assembly 300 are substantially prevented from being disconnected from the first and second electrodes and arranged to allow for easily handling.

Figure 15:
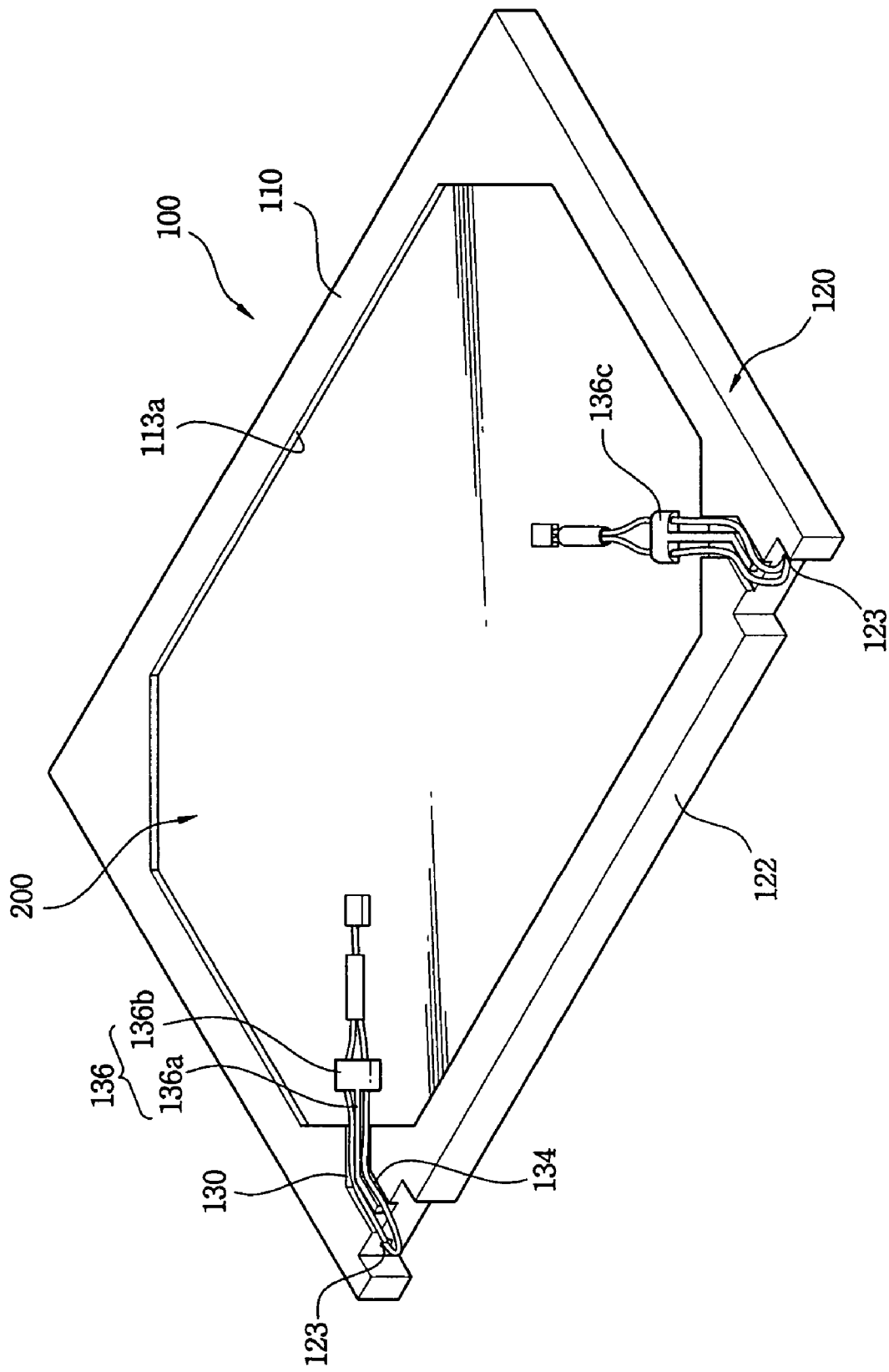
FIG. 15 shows a perspective view of a rear chassis of a backlight assembly according to another exemplary embodiment of the present invention.

FIG. 15 shows a perspective view of a rear chassis of a backlight assembly according to another exemplary embodiment of the present invention. Many of the elements in FIG. 15 are similar to the elements of FIGS. 13 and 14 as discussed in detail above. Accordingly, a duplicative detailed discussion about the elements will be omitted.

Referring to FIG. 15, the securing member 136 protrudes from the lower plate 110. The securing member 136 may be arranged between the inner and outer surfaces of the lower plate 110 and extends from an opening in the inner surface 113a. The securing member 136 secures the lamp wiring in trenches 130 and 134.

The securing member 136 includes first securing part 136a and second securing part 136b. The first securing part 136a extends from an opening in the inner surface 113a. The second securing part 136b may be arranged at any angle from the first securing part 136a. For example, the second securing part 136b may be arranged substantially perpendicular to the first securing part 136a. In this configuration the second securing part 136b is substantially parallel with the lower plate 110.

A securing groove 136c may be formed on a surface of the second securing part 136b of securing member 136 opposite a surface of the second receiving container 200. The securing part 136 may include a plurality of the first lamp wirings 342, a plurality of the second lamp wirings 344, and a plurality of the securing parts 136c. The number of securing grooves 136c provided may be identical to the number of the number of first wiring 342 and second lamp wiring 344. The first lamp wiring 342 and second lamp wiring 344 are inserted into the securing groove 136c for securing the lamp wirings. Accordingly, the first lamp wiring 342 and second lamp wiring 344 are secured within the trenches 130 and 134. A remainder portion of the first lamp wiring 342 and second lamp wiring 344 are secured with the wiring securing member 136.

Figure 16:
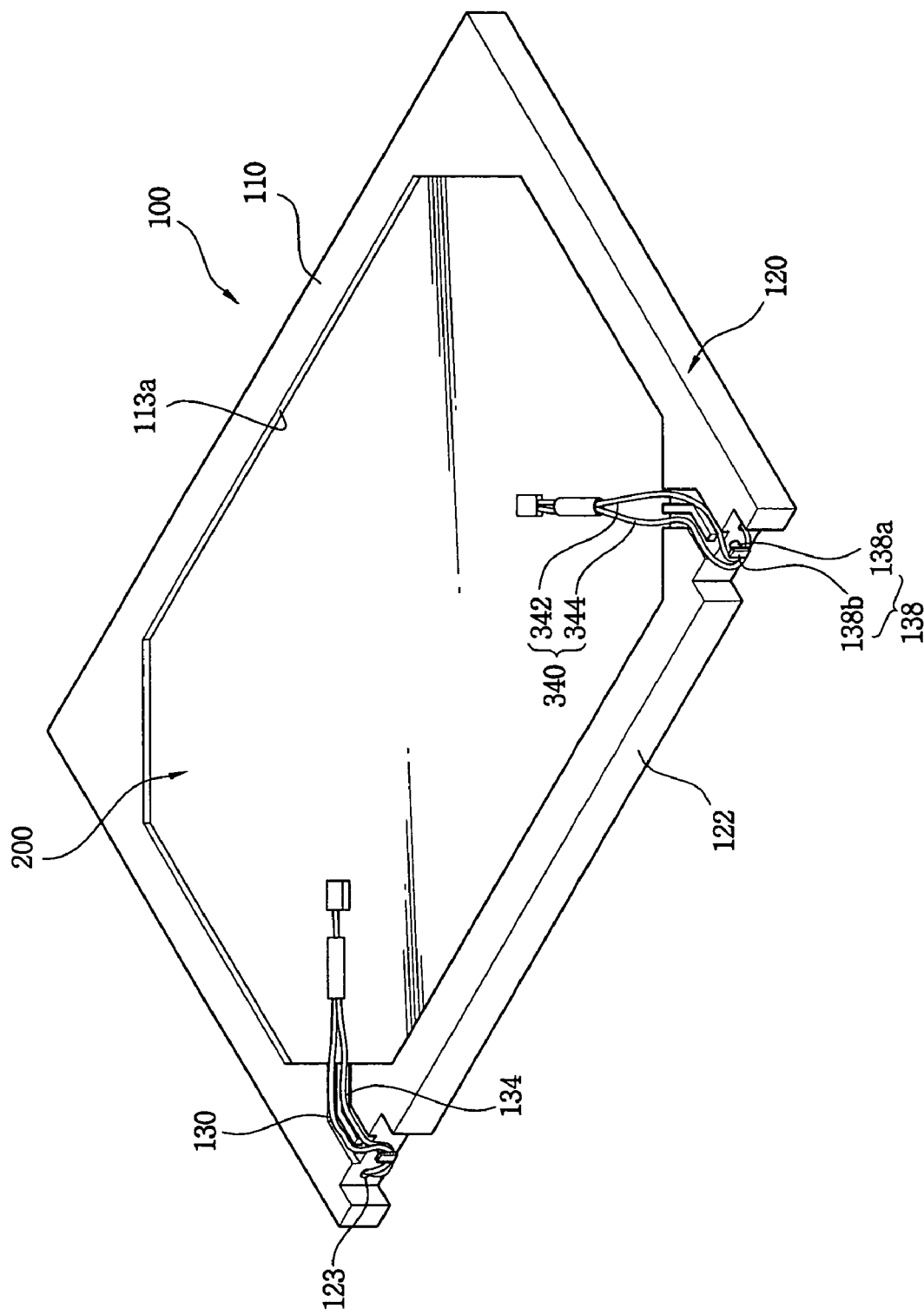
FIG. 16 shows a perspective view of a rear chassis of a backlight assembly according to another exemplary embodiment of the present invention.

FIG. 16 shows a perspective view of a rear chassis of a backlight assembly according to another exemplary embodiment of the present invention. Many of the elements in FIG. 16 are similar to the elements of FIGS. 13 and 14 as discussed in detail above. Accordingly, a detailed discussion about the identical elements will be omitted.

Referring to FIG. 16, a securing projection 138' is formed on a first sidewall 122 and arranged under a portion of trench 130. The securing projection 138' prevents the first lamp wiring 342 and second lamp wiring 344, protruding from through-hole 123, from being disconnected from the lamp.

The securing projection 138' includes a first securing projection 138a and second securing projection 138b. The first securing projection 138a protrudes at a predetermined distance below a portion of trench 130 and is arranged on the first sidewall 122. The securing projections 138' may include a plurality of the second securing projections 138b arranged at various angles. The second securing projections 138b may be arranged at an end portion of the first securing projection 138a. There may be a plurality of securing projections 138' around the first sidewall 122.

In one configuration, for example, there are two securing projections 138a having two second securing projections 138b arranged on each of the two securing projections 138a, respectively. In this configuration, each of the securing projections 138b are arranged in a direction that is substantially parallel with the first sidewall 122, thereby allowing for a decrease in the size of the LCD apparatus and simplifying the manufacturing process.

Additionally, the first lamp wiring 342 and second lamp wiring 344 are arranged in the securing projections 138 to enable the wirings to be secured within trenches 130 and 134. Accordingly, the first lamp wiring 342 and second lamp wiring 344 are prevented from being disconnected from the lamp 310 if external forces are applied to the first lamp wiring 342 and second lamp wiring 344.

Figure 17:
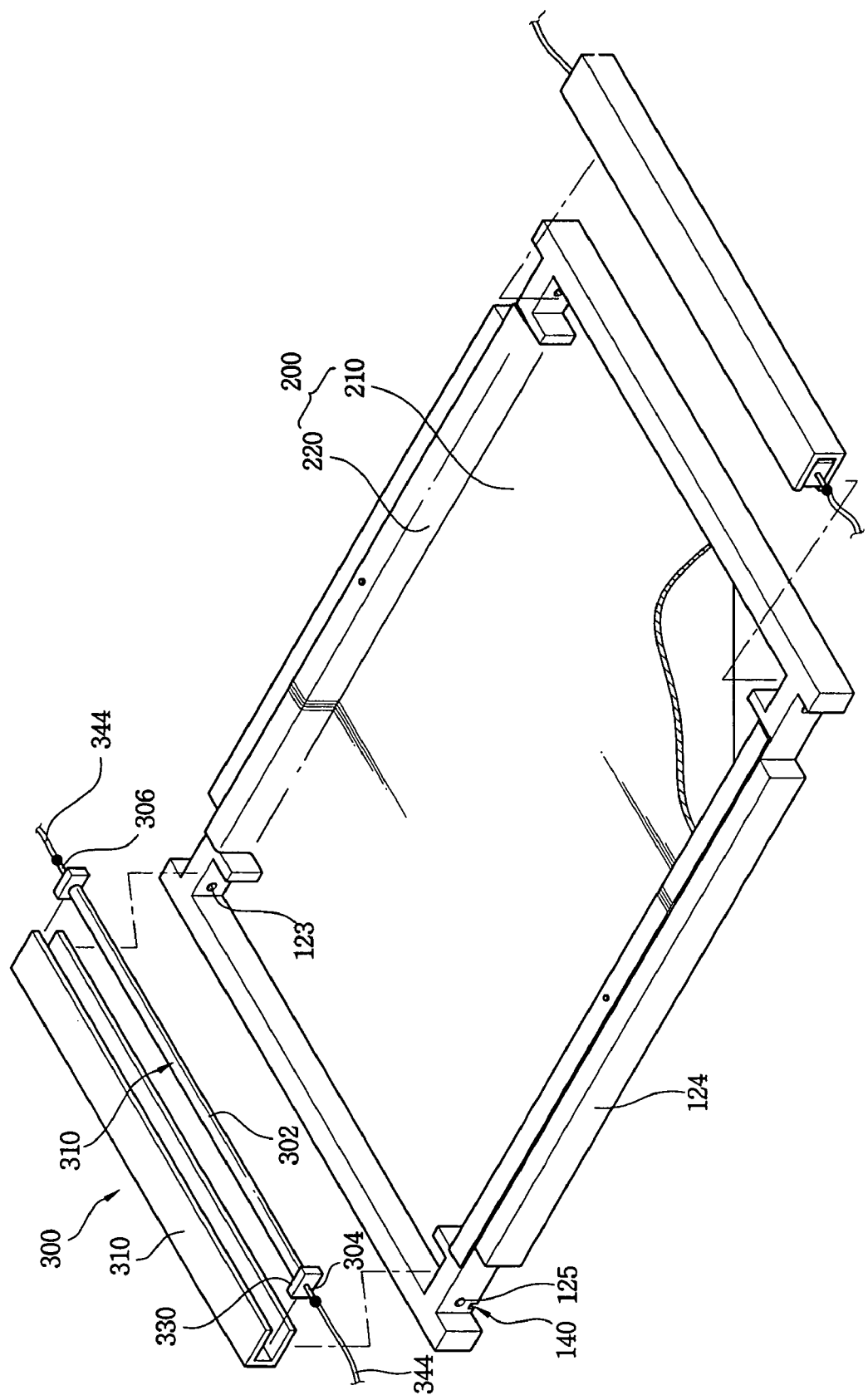
FIG. 17 shows a disassembled perspective view of a backlight assembly according to another exemplary embodiment of the present invention.
Figure 18:
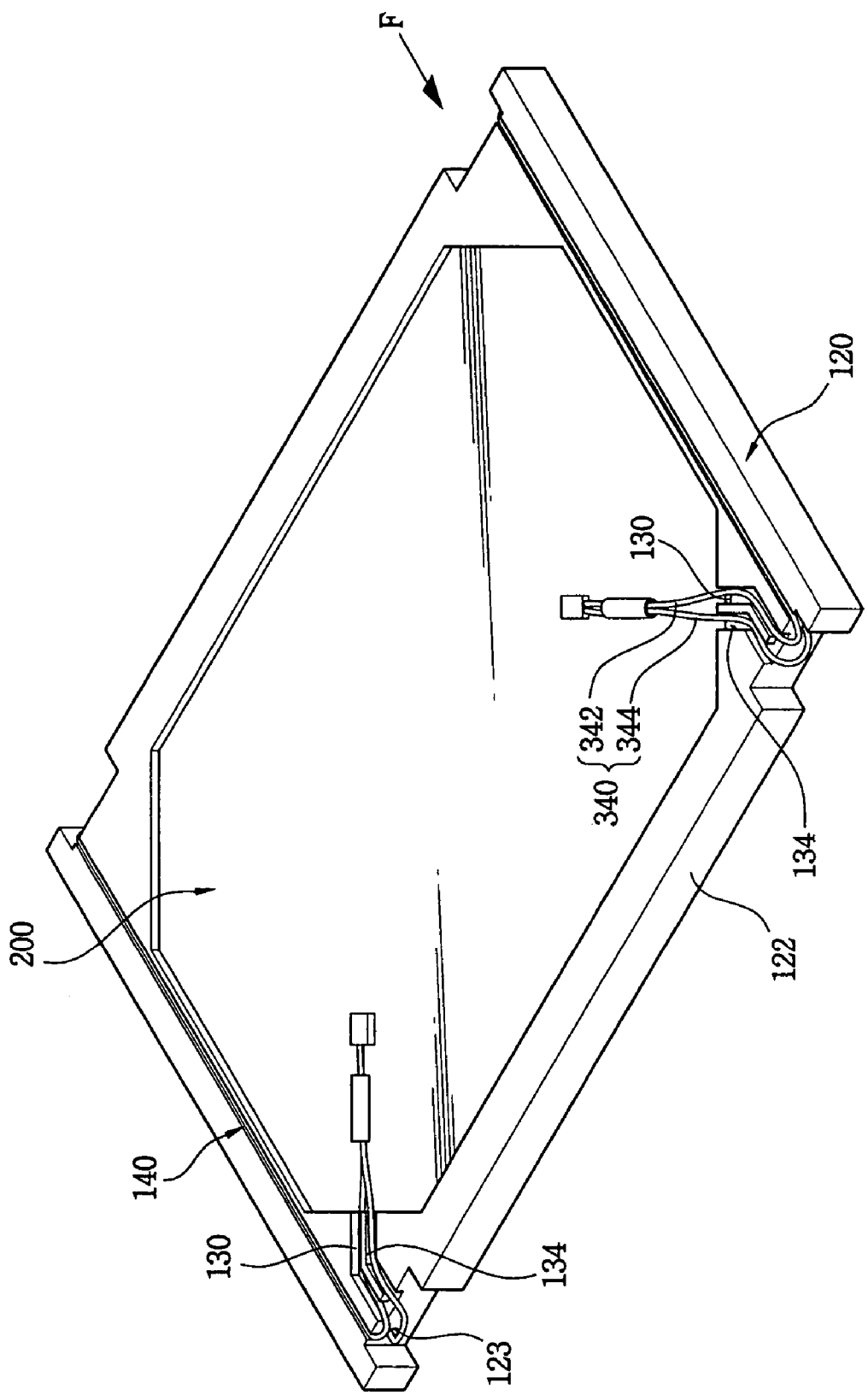
FIG. 18 shows a perspective view of a rear chassis of the backlight assembly of FIG. 17.

FIG. 17 shows a disassembled perspective view of a backlight assembly according to another exemplary embodiment of the present invention. FIG. 18 shows a perspective view of a rear chassis of the backlight assembly of FIG. 17. Many of the elements in FIGS. 17 and 18 are similar to the elements of FIGS. 13 and 14 as discussed in detail above. Accordingly, a detailed discussion about the identical elements will be omitted.

Referring to FIGS. 17 and 18, a through-hole 125 is formed on the second sidewall 124 of the first receiving container 100 and is arranged to be substantially opposite to the first sidewall 122. Accordingly, the first through-hole 123 and second through-hole 125 face each other. The first lamp wiring 342 is connected to the first electrode 304 of the lamp assembly 300 and protrudes from the second through-hole 125. The second lamp wiring 344 is connected to the second electrode 306 of the lamp assembly 300 and protrudes from the first through-hole 123 into the receiving space.

The first lamp wiring 342 protruding from the second through-hole 125 is secured by trench 130. The trench 130 is arranged along an outer surface of lower plate 110 from an outer surface of the first sidewall 122 into an opening inner surface 113a. Additionally, the first lamp wiring 342 is secured by an auxiliary trench 140 formed along the outer surface of the lower plate 110. Accordingly, the first lamp wiring is substantially prevented from being disconnected from the lamp.

The second lamp wiring 344 of the lamp assembly 300 is arranged through the first through-hole 123 so as to be secured with trench 134, thereby obtaining an LCD apparatus having decreased weight and size.

Figure 19:
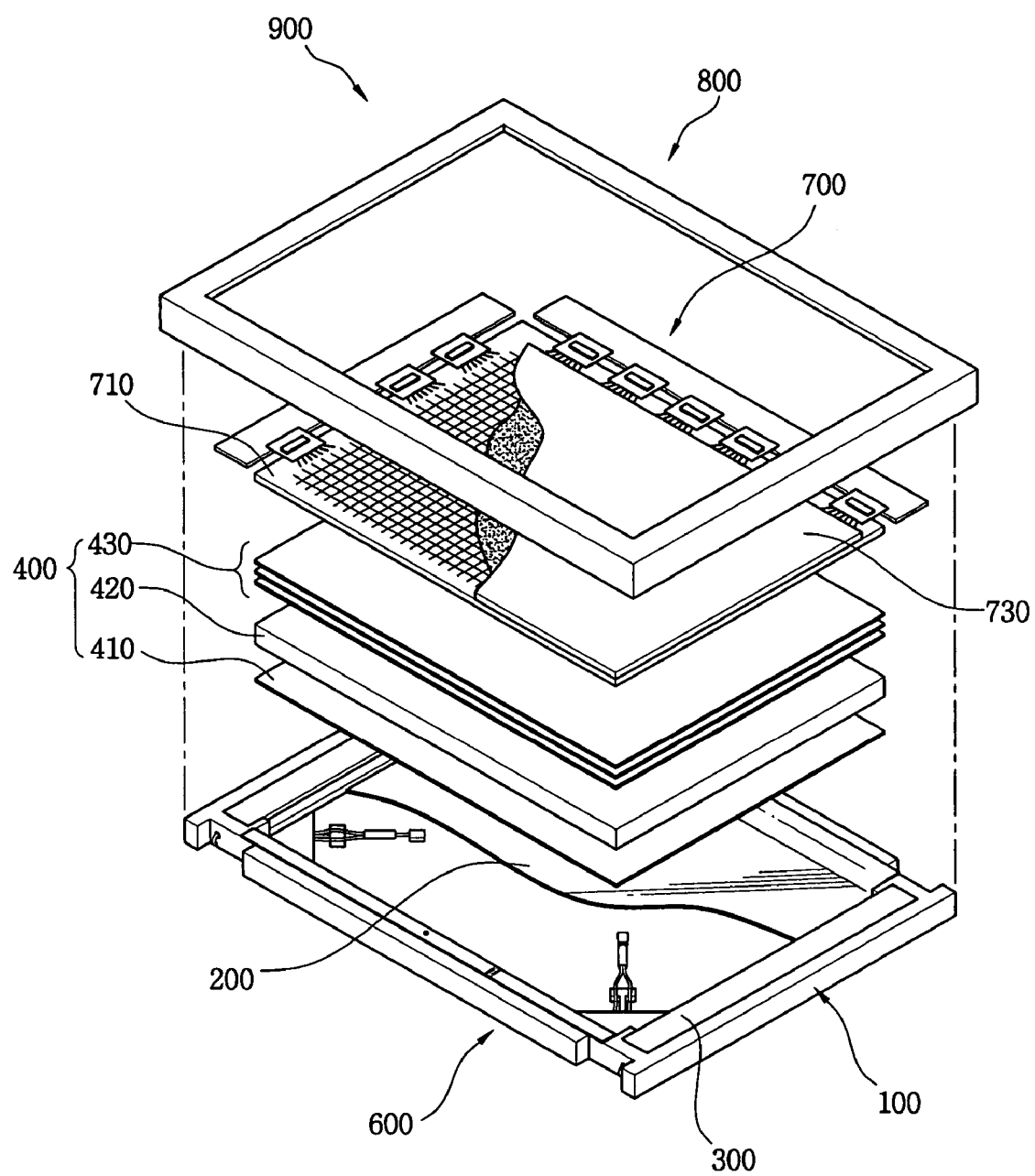
FIG. 19 shows a disassembled view of an LCD apparatus according to an exemplary embodiment of the present invention.

FIG. 19 shows a disassembled view of an LCD apparatus according to an exemplary embodiment of the present invention. Many of the elements in FIG. 19 are similar to the elements of FIGS. 1, 2, 13, and 14 as discussed in detail above. Accordingly, a detailed discussion about the identical elements will be omitted.

Referring to FIG. 19, the LCD apparatus includes the chassis 800, an LCD panel 700, an optical member 400, a lamp assembly 300, and a receiving container 100.

The lamp assembly 300 and optical member 400 are arranged in the receiving container 100. The optical member 400 includes a reflecting plate 410, a light guide plate 420, and optical sheets 430.

The reflecting plate 410 is arranged on the lower plate of the receiving container 100. The light guide plate 420 is arranged on the reflecting plate 410, and the optical sheets 430 are arranged on the light guide plate 420.

The light guide plate 420 is inserted into the receiving container 100. The light guide plate 420 includes a plurality of side surfaces, a light reflecting surface, and a light exiting surface. The light reflecting surface is arranged opposite to the lower plate of the receiving container 100. The light exiting surface is arranged opposite to the light reflecting surface. The light guide plate 420 changes light optical distributions generated from the lamp assembly 300, thereby determining the direction of the light.

The reflecting plate 410 is arranged between the light reflecting surface of the light guide plate 420 and the lower plate of the receiving container 100. The reflecting plate 410 reflects light leaked from the light reflecting surface of the light guide plate 420.

The optical sheets 430 are arranged on the light exiting surface of the light guide plate 420. The optical sheets 430 change the light's optical and luminance distribution exiting the light guide plate, thereby generating a light having uniform optical and luminance distributions. The optical sheets 430 include a diffusion sheet, a prism sheet, a luminance compensation film, a viewing angle compensation film, and the like. Additionally, any combination of the foregoing films may also be utilized.

The LCD panel assembly 700 includes a TFT substrate 710, a liquid crystal 720, and a color filter substrate 730. The LCD panel assembly 700 converts light from the optical member 430 into an image for displaying information. The LCD assembly 700 is disposed in the receiving container 100.

The chassis 800 prevents the LCD panel assembly 700 from being separated from the LCD apparatus and from being damaged by external forces. A portion of the chassis 800 pressurizes the edges of the LCD panel assembly 700, and the remainder is secured within receiving container 100.

According to aspects of the present invention, lamp wirings are connected to the lamp for operating the lamp and supplying light to the LCD panel. The lamp wirings are secured with the wiring receiving members formed on the rear surface of the receiving container. Accordingly, the lamp wiring is easily handled and is prevented from being disconnected from the lamp.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A receiving container for an LCD apparatus, comprising:
    a lower plate having a first sidewall, wherein the first sidewall includes a through-hole; and
    a trench formed on an upper surface of the lower plate, wherein the trench extends toward an inner portion of the lower plate at an angle with respect to the first sidewall and substantially prevents lamp wiring from being disconnected from a lamp.

2. The receiving container for an LCD apparatus of claim 1, wherein the trench includes a first trench and a second trench.

3. The receiving container for an LCD apparatus of claim 1, wherein the trench has a width $W_1$ and a depth $D_1$ formed in order to substantially prevent the lamp wiring from protruding from the trench.

4. The receiving container for an LCD apparatus of claim 3, wherein the trench has a width $W_1$ and a depth $D_1$ formed to be greater than a diameter of the lamp wiring.

5. The receiving container for an LCD apparatus of claim 1, wherein the lower plate includes an opening for decreasing weight of the LCD apparatus.

6. The receiving container for an LCD apparatus of claim 5, wherein the opening dissipates heat generated by the LCD.

7. The receiving container for an LCD apparatus of claim 1, wherein the lamp wiring is arranged from first position inside the receiving container to a second position outside the receiving container via the through-hole and a portion of the lamp wiring outside the receiving container is inserted into the trench.

8. The receiving container for an LCD apparatus of claim 1, further comprises a securing member extendable from a first position to a second position, wherein the securing member has a first portion and a second portion.

9. The receiving container for an LCD apparatus of claim 8, wherein the second portion of the securing member comprises a securing groove which secures a portion of the lamp wiring.

10. The receiving container for an LCD apparatus of claim 9, wherein a number of the securing grooves is equal to the number of lamp wires.

11. The receiving container for an LCD apparatus of claim 1, further comprises a securing projection arranged on a first sidewall proximate the through-hole.

12. The receiving container for an LCD apparatus of claim 11, wherein the securing projection includes a first portion and second portion and the second portion is arranged at predetermined angle from an end portion of the first portion.

13. The receiving container for an LCD apparatus of claim 12, wherein the first portion and second portion are arranged to form a T shape and a portion of the lamp wiring is arranged on the securing projection to substantially prevent the lamp wiring from being disconnected from a lamp.

14. The receiving container for an LCD apparatus of claim 1, further comprising a through-hole formed on a sidewall opposite the first sidewall for receiving the lamp wiring.

15. The receiving container for an LCD apparatus of claim 5, further comprising a securing member for securing the lamp wiring extending from the trench, wherein the securing member protrudes into the opening.

16. The receiving container for an LCD apparatus of claim 8, wherein the first portion is substantially perpendicular to the second portion, and the second portion comprises a first securing groove positioned adjacent one side of the first portion and a second securing groove positioned adjacent another side of the first portion, wherein the first and second securing grooves each secure a portion of the lamp wiring.

17. The receiving container for an LCD apparatus of claim 11, wherein the lamp wiring is arranged around the securing projection.

* * * * *